March 2, 1954  J. A. GORDON ET AL  2,670,673
FLUID INJECTING DEVICE
Filed July 17, 1950
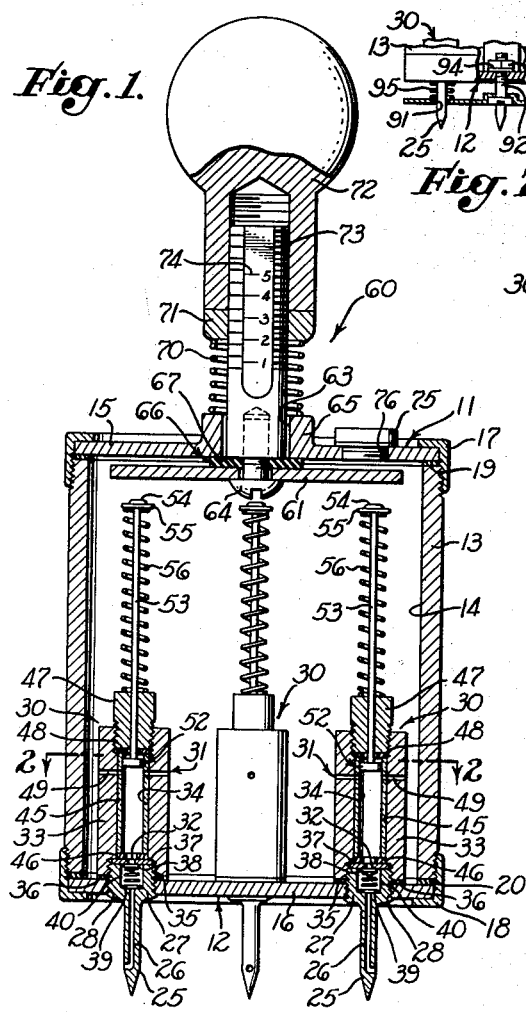
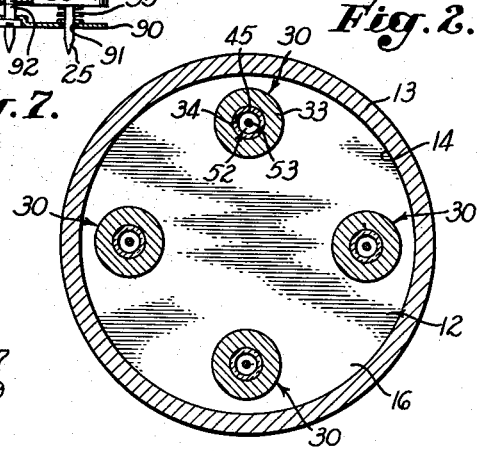
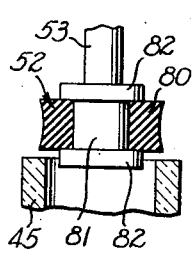
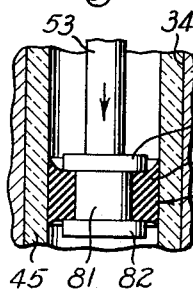
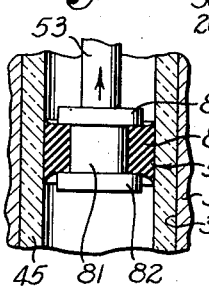
INVENTORS.
JOYCE A. GORDON
ISRAEL A. GORIN
BY THEIR ATTORNEYS.
HARRIS, KIECH, FOSTER & HARRIS
BY Patented Mar. 2, 1954

2,670,673

UNITED STATES PATENT OFFICE 2,670,673

FLUID INJECTING DEVICE

Joyce A. Gordon and Israel A. Gorin,
Los Angeles, Calif.

Application July 17, 1950, Serial No. 174,162

14 Claims. (Cl. 99—257)

Our invention relates in general to fluid injecting devices, and more particularly, to a device which finds particular utility in injecting curing or tenderizing liquids into meats of various types, although it may in many instances be employed for injecting other fluids into other substances.

It is, of course, common practice to cure such meats as bacon and ham by injecting suitable curing liquids thereinto, and to inject into other meats liquids which have a tenderizing effect. Such liquids are customarily injected by means of a hollow or tubular injection needle, similar to a hypodermic needle, which is connected to a pump in fluid communication with the outlet of the pump. Heretofore, such fluid injecting devices have consisted of a single pump having one or more injection needles connected to the outlet thereof, the use of a plurality of injection needles connected to the pump of such a conventional device being preferable to reduce the excessive time required to treat a piece of meat with a single needle. However, the use of a plurality of injection needles connected to the outlet of the pump has a serious disadvantage in that uneven distribution of the liquid being injected may result. In other words, since meat is never completely uniform in texture and/or density, the resistance to liquid penetration offered by the meat frequently varies widely from needle to needle with the result that, in some instances, substantially all of the liquid discharged by the pump will be injected into the meat by one or two of the needles and substantially none of the liquid will be injected into the meat by the remaining needles.

A primary object of the present invention is to provide a fluid injecting device having a plurality of injection needles and having means for injecting substantially equal amounts of fluid through all of the needles irrespective of the texture and/or density of the meat.

More particularly, an important object of the invention is to provide such a fluid injecting device having a separate pump for each needle and having means for actuating the pumps in unison so as to discharge equal amounts of liquid through all of the needles.

Another object is to provide a common fluid supply means for all of the pumps by disposing the pumps within a fluid supply chamber with the inlets of the pumps in fluid communication with the chamber.

Another object is to provide such a fluid injecting device wherein the fluid supply chamber is defined by upper, lower and side walls of a housing of the device, and wherein the pumps are carried by the lower wall of the housing and extend upwardly into the fluid supply chamber with their inlets in fluid communication with the chamber, the lower wall of the housing being detachably connected to the side walls thereof so that the pumps may be removed readily.

Another object of the invention is to provide such a fluid injecting device wherein each pump includes a cylinder having therein a piston provided with an axial stem projecting upwardly from its cylinder into the fluid supply chamber, and to provide a fluid injecting device having actuating means operatively connected to the stems of said pistons for operating said pumps in unison to discharge substantially equal amounts of fluid through the injection needles connected to the outlets of the pump.

It is also an object to provide an injector device having a pump extending upward into a liquid chamber and immersed in said liquid whereby to receive a liquid charge into the upper end of the cylinder by suction and by a head of liquid in the chamber.

Another object is to provide a reciprocable actuating means which carries valve means for opening a vent passage into the fluid supply chamber on each discharge stroke of the pumps so as to admit air into the supply chamber to replace the liquid discharged by the pumps.

Another object is to provide adjustable stop means for limiting the stroke of the actuating means so that the amounts of fluid discharged by the pumps may be varied.

A further object is to provide an actuating means having indicia thereon opposite any desired one of which the adjustable stop means may be positioned so that the user of the device may readily predetermine the amounts of fluid to be discharged by the pumps.

The foregoing objects and advantages of our invention, together with various other objects and advantages thereof which will become apparent, may be attained with the exemplary embodiment of the invention illustrated in the accompanying drawing and described in detail hereinafter. Referring to the drawing:

Fig. 1 is a vertical sectional view of a fluid injecting device which embodies the invention;

Fig. 2 is a transverse sectional view taken along the broken line 2—2 of Fig. 1;

Fig. 3 is a fragmentary vertical sectional view duplicating a portion of Fig. 1, but illustrating elements of the device in different operating positions;

Fig. 4 is an enlarged, fragmentary sectional view of a piston of the invention removed from its cylinder;

Figs. 5 and 6 are enlarged, fragmentary sectional views illustrating a piston of the invention in its cylinder during the discharge and return strokes, respectively, of the piston; and Fig. 7 is a fragmentary sectional view of an alternative embodiment of the invention.

Referring particularly to Figs. 1 and 2 of the drawing, the fluid injecting device of the invention includes a housing having upper and lower walls 11 and 12 and a cylindrical side wall 13 which define a fluid supply chamber 14, the upper and lower walls 11 and 12 respectively comprising plates 15 and 16 which are connected to the side wall 13 by clamping rings 17 and 18, respectively, threaded onto the side wall. Suitable gaskets 19 and 20 respectively disposed between the plates 15 and 16 and the side wall 13 prevent leakage from the fluid supply chamber 14.

The fluid injecting device includes a plurality of hollow or tubular injection needles 25 which are generally similar to hypodermic needles and which are provided with fluid passages 26, respectively, therethrough. The outer ends of the passages 26 are directed transversely to the needle axes so that plugging of the openings by the meat to be treated is avoided as the needles are forced into the meat. In the particular construction illustrated, four of the injection needles 25 are shown, although it will be understood that the device may be provided with any desired number of such needles. The needles 25 depend from the lower wall 12 of the device and are provided at their upper ends with heads 27 which are threaded into suitable bores 28 through the plate 16.

Extending upwardly into the fluid supply chamber 14 from the lower wall 12 of the device are pumps 30 of the reciprocating type, there being one such pump for each of the injection needles 25. Each pump 30 is provided with an inlet 31 which communicates with the fluid supply chamber 14, and is provided with an outlet 32 which communicates with the passage 26 through the corresponding injection needle 25. Each pump 30 comprises a cylinder 33 having a bore 34 therethrough and having a counterbore 35 at its lower end, the head 27 of the corresponding injection needle 25 being threaded into the counterbore 35 to secure the cylinder 33 to the plate 16 of the lower wall 12. A fluid-tight seal between each cylinder 33 and the plate 16 is provided by a gasket or washer 36 disposed between the lower end of the cylinder and the plate 16 and encircling the head 27 of the corresponding injection needle 25. The outlet 32 of each pump 30 takes the form of an orifice through an orifice plate 37 in the particular construction illustrated, the orifice plate being clamped between the head 27 of the corresponding injection needle 25 and the base of the counterbore 35 in the cylinder 33. The outlet 32 of each pump 30 is controlled by an outwardly opening check valve 38 which is biased against the lower surface of the corresponding orifice plate 37 by a compression spring 39 seated at one end against the check valve 38 and at its other end against the base of a counterbore 40 in the head 27 of the corresponding injection needle 25.

Disposed in the cylinder 33 of each pump 30 is a liner 45 which is preferably formed of glass, or a similar material. The liner 45 of each pump is sealed at its lower end relative to the corresponding orifice plate 37 by a washer 46, preferably formed of rubber, or other similar material. The upper end of the cylinder 33 of each pump is closed by a piston stem guide 47 threaded into the upper end of the bore 34 therein, each piston stem guide being sealed relative to the corresponding liner 45 by a washer 48 of rubber, or the like.

The inlet 31 of each pump 30 comprises one or more radial inlet ports 49 which extend through the cylinder 33 and the liner 45 therein.

Reciprocable in each liner 45 is a piston 52 having a stem 53 which projects axially upwardly into the fluid supply chamber 14 through the corresponding stem guide 47. Each stem 53 is provided at its upper end with a peened head 54, or the like, against which is seated a washer 55, a compression spring 56 encircling the stem 53 and being seated at its upper end against the washer 55 and at its lower end against the corresponding piston stem guide 47. The springs 56 bias the pistons 52 upwardly toward the upper ends of their strokes to effect the return strokes of the pistons.

The fluid injecting device of the invention includes actuating means 60 for operating the pumps 30 in unison, the actuating means including an actuator 61, exemplified as a circular plate which is adapted to engage the piston heads 54 at the upper ends of all of the piston stems 53. The actuating means 60 also includes a stem 62 which projects upwardly through a bore 63 in the upper plate 15, the actuator 61 being connected to the lower end of the stem 62 by a screw 64, or the like. The diameter of the bore 63 exceeds that of the stem 62 so as to provide therebetween a clearance which serves as a vent passage for admitting air into the fluid supply chamber 14 to replace fluid discharged by the pumps 30, the bore 63 being formed in a boss 65 on the plate 15. The actuating means 60 carries inwardly opening check valve means 66 for preventing leakage from the fluid supply chamber 14 through the vent passage when the device is not in use, the check valve means 66 comprising a valve element 67 which encircles the screw 64 and which is clamped between the lower end of the stem 62 and the actuator 61. As will be apparent, the valve element 67 seats on the lower surface of the upper plate 15 to close the vent passage.

The actuating means 60 and the check valve means 66 carried thereby are biased upwardly so as to disengage the actuator 61 from the piston stems 53 and to seat the valve element 67 by a compression spring 70 which encircles the stem 62 of the actuating means and which is seated at its lower end against the boss 65. The spring 70 is seated at its upper end against a lock nut 71 threaded on the stem 62, a handle 72 being threaded onto the stem 62 above the lock nut.

As will be apparent, the position of the lock nut 71 on the stem 62 determines the stroke of the stem 62 and the actuator 61, and thus determines the strokes of the pistons 52, thereby determining the amounts of fluid discharged by the pumps 30. Thus, by varying the positions of the lock nut 71 and the handle 72 on the stem 62, the user of the fluid injecting device may readily vary the amounts of fluid discharged by the pumps 30, the lock nut 71 and handle 72 thus forming an adjustable stop means of the invention, which is an important feature.

As best shown in Fig. 1, the stem 62 of the actuating means 60 is provided with a flat 73 which carries indicia 74, suitable reference characters, such as the numerals "1," "2," and so forth, appearing opposite the respective indicia. The reference characters opposite the indicia 74 may designate the amount of fluid discharged by each pump 30 per stroke, may designate the amount of fluid discharged by all pumps per stroke, or the like.

Considering the operation of the fluid injecting device of the invention, the user thereof first fills the fluid supply chamber 14 with the desired liquid, which liquid may, for example, be designed to tenderize meat. For this purpose, the upper plate 11 is provided with a removable filler plug 75 threaded into a bore 76 therein. Or, the ring 17 may be removed together with the plate 15 for the purpose of filling. It will be noted that when the fluid supply chamber 14 has been filled with the desired liquid, the compression spring 70 maintains the valve element 67 seated so as to close the vent passage between the stem 62 and the wall of the bore 63 in the upper plate 15 except while the actuating means 60 is being depressed. Similarly, the compression springs 39 close the check valves 38 controlling the outlets 32 of the pumps 30. Thus, the operator may lay the device on its side when not in use without any danger or leakage.

Assuming that the fluid supply chamber 14 has been filled with liquid in the manner hereinbefore discussed, the operator of the device inserts the injection needles 25 into the piece of meat, or other substance to be treated, and depresses the handle 72 one or more times to pump one or more "shots" of liquid into the meat through each injection needle, depending upon the amount of liquid required to effect the desired treatment. The bottom wall 12 serves as stop means to limit penetration of the needles in this embodiment. As will be apparent, each return stroke of the actuating means 60 is effected by the spring 70, it merely being necessary for the operator to depress the handle 72 once for each "shot." As will also be apparent, the position of the handle 72 and the lock nut 71 on the stem 62 determines the amount of liquid injected per "shot," the amount per "shot" being readily predeterminable by suitably positioning the lock nut 71 and the handle 72 relative to the indicia 74. As will further be apparent, each time the handle 72 is depressed in the foregoing manner, the valve element 67 unseats to admit the fluid supply chamber 14 sufficient air to replace the liquid discharged by the pumps 30.

Considering the operation of the pumps 30, the actuator 61 engages the upper ends of the piston stems 53 each time the handle 72 is depressed and moves all of the pistons 52 downwardly in unison and through substantially the same distances so that the amounts of liquid discharged by the various pumps are all equal, irrespective of variations in the penetrability of the meat, or other substance, into which the injection needles 25 are inserted, which is an important feature of the invention. As will be apparent, as each piston moves downwardly, it first moves across the inlet 31 in its cylinder 33 and thereafter displaces liquid from therebeneath through the corresponding outlet 32 and check valve 38 and through the corresponding injection needle 25 into the meat or other substance being treated, the corresponding check valve 38 opening to permit such displacement of liquid by the piston. As hereinbefore pointed out, the amount of liquid displaced by each piston depends upon the position of the adjustable stop means provided by the handle 72 and the lock nut 71, the amount displaced being the same for each pump 30. When the operator releases the handle 72 after each discharge stroke, so that the spring 70 returns the actuator 61 to the upper end of its stroke, the compression springs 56 associated with the pistons 52 return the respective pistons to the upper ends of their strokes. Upon completion of the injection stroke, the corresponding check valve 38 closes, so that, as soon as the return stroke of each piston 52 commences, the piston tends to create a vacuum within its cylinder. Consequently, as soon as the piston unports the corresponding inlet 31, the pressure differential between the chamber 14 and the interior of the cylinder results in immediate filling of the cylinder for the next pumping stroke, which is an important feature.

In order to produce the vacuum discussed in the preceding paragraph during the return stroke of each piston 52, it is desirable that the piston make a substantially fluid-tight seal with respect to its liner 45. Referring particularly to Fig. 4, we prefer to accomplish this by employing as each piston 52 a resilient annular piston element 80 of rubber, or other material of a rubber-like nature, the piston element 80 being mounted on a core 81 between two flanges 82 in the particular construction illustrated. The core 81 is suitably secured to the corresponding piston stem 53. The external diameter of the piston element 80 is greater than the internal diameter of the corresponding liner 45 and the circumferential wall of the piston element is concave intermediate the ends of the element, as seen in Fig. 4. Consequently, when the piston is inserted into its liner, the piston element 80 is compressed radially to insure fluid-tight engagement with the liner and is expanded axially to increase the area of contact. The action of the resilient piston element 80 during the pumping and return strokes is illustrated in Figs. 5 and 6, respectively, the piston flexing upwardly during the pumping stroke and flexing downwardly during the return stroke.

Referring to Fig. 7, illustrated therein is an alternative stop means for limiting insertion of the needles 25 into the meat, comprising a disc or plate 90 having holes 91 through which the needles extend, the plate 90 being seated on the head of a screw 92 threaded through the plate 16 and retained by a lock nut 93, a gasket 94 is disposed under the lock nut. Springs 95 encircling the needles 25 hold the plate 90 seated on the head of the screw 92, such springs being sufficiently heavy to prevent movement of the plate 90 upwardly under forces normally applied to the device. As will be apparent, the depth of penetration of the needles 25 may readily be varied with this construction.

Although we have disclosed an exemplary embodiment of our invention for purposes of illustration, it will be understood that various changes, modifications and substitutions may be incorporated therein without departing from the spirit of the invention.

We claim as our invention:

1. In a fluid injecting device, the combination of: a housing having upper, lower and side walls which define a supply chamber for a fluid; a plurality of pumps each having an inlet and an outlet, said pumps being carried by said lower wall of said housing and extending upwardly into said chamber with said inlets in fluid communication with said chamber, each of said pumps including a cylinder having therein a piston provided with an axial stem projecting upwardly from said cylinder into said chamber; a plurality of tubular injection needles respectively connected to said pumps in fluid communication with said outlets thereof and extending downwardly from said lower wall of said housing; a reciprocable actuator in said chamber and adapted to engage the upper ends of said stems of said pistons for operating said pumps in unison; a stem connected to said actuator and projecting upwardly through an opening in said upper wall of said housing; and a valve element connected to said actuator so as to be reciprocable therewith, said valve element being adapted to engage the lower surface of said upper wall of said housing adjacent said opening therethrough, said opening being larger than said actuator stem to provide between the wall of said opening and said actuator stem a vent passage for said chamber, said valve element closing said vent passage when it seats on said lower surface of said upper wall of said housing.

2. A fluid injecting device according to claim 1 including resilient means for biasing said valve element into engagement with said lower surface of said upper wall of said housing.

3. In a fluid injecting device, the combination of: a housing having upper, lower and side walls which define a fluid supply chamber; a pump carried by said lower wall of said housing and extending upwardly into said chamber, said pump having an inlet which communicates with said chamber and having an outlet, said pump including a cylinder having therein a piston provided with an axial stem which extends upwardly from said cylinder into said chamber; a tubular injection needle connected to the lower end of said pump in fluid communication with said outlet; a reciprocable actuator in said chamber and adapted to engage the upper end of said stem of said piston, said actuator having a stem which extends upwardly from said chamber through an opening in said upper wall of said housing, said opening being larger than said stem on said actuator so as to provide a vent passage for said chamber; and valve means carried by said actuator for opening said vent passage in response to downward movement of said actuator.

4. A device as in claim 3 wherein said reciprocable actuator is normally spaced above said stem of said piston and means is provided on said actuator stem to return said actuator to said elevated position and cause said valve means to close said vent passage.

5. A fluid injecting device as defined in claim 3 wherein said valve means includes a valve element carried by said actuator and adapted to seat against the lower surface of said upper wall of said housing adjacent said opening therethrough when said actuator is at the upper end of its stroke.

6. In a fluid injecting device, the combination of: a housing having upper, lower and side walls which define a fluid supply chamber; a pump carried by said lower wall of said housing and extending upwardly into said chamber, said pump being wholly disposed within said chamber and including a cylinder having a piston therein, said cylinder having an outlet and also having an inlet which communicates with said chamber and is covered by said piston to exclude liquid and is uncovered by said piston to receive and feed liquid to said outlet, said piston being provided with an axial stem which extends upwardly from said cylinder into said chamber; a tubular injection needle connected to the lower end of said pump in fluid communication with said outlet; a reciprocable actuator in said chamber and normally spaced above and adapted to engage the upper end of said stem of said piston, said actuator having a stem which extends upwardly from said chamber through an opening in said upper wall of said housing; spring means to return said piston stem; spring means to return said actuator stem; and adjustable stop means threaded exteriorly on said stem of said actuator and engageable with an outer portion of said upper wall of said housing for limiting displacement of said actuator so as to limit displacement of said piston of said pump, thereby limiting the amount of fluid displaced by said pump.

7. A fluid injecting device as defined in claim 6 wherein said stem of said actuator is provided with indicia thereon corresponding to different fluid displacements by said piston, said adjustable stop means being registrable with any desired one of said indicia.

8. In combination in a fluid-injecting device: a portable, invertible housing having upper, lower and side walls enclosing a supply chamber to retain liquid without loss on inversion; sealing filler means in one of said walls; pump cylinders carried by said lower wall and positioned in said chamber, said cylinders having inlets in their upper portions for communication with said chamber and having outlets leading through said lower wall; injection needles connected with said lower wall and said outlets and extending outside said lower wall; check valve means at said outlets providing for passage of liquid out through said needles; pistons in said pump cylinders movable from positions above said inlets to positions adjacent said outlets to expel liquid through said check valve means and said needles; spring-controlled plunger means on said pistons and extending into said chamber; actuating and manipulating means reciprocably carried by said upper wall and including a stem extending through said upper wall, a handle on the outer end of said stem, spring means urging said stem and handle outward, and means on the inner end of said stem movable into engagement with said plunger means to actuate the pistons into said cylinders upon depression of said handle; and means for admitting air into said chamber upon operation of said actuating means.

9. A combination as in claim 8 including adjusting means carried by said handle and stem to regulate the stroke thereof and of said plunger means and pistons.

10. A combination as in claim 8 wherein said air-admitting means includes check valve means carried by said stem and engageable with closure means on said upper wall.

11. A combination as in claim 8 wherein said actuating means includes means within said chamber normally spaced from said plunger means for actuation thereof.

12. In a portable liquid-injecting hand-tool, the combination of: an invertible housing having upper, lower and side walls defining a supply chamber for enclosing and retaining a body of injectable liquid; a plurality of pumps, each of which includes a cylinder carried by said lower wall and wholly disposed in said chamber in upstanding relation, each cylinder having an inlet and a valve-controlled outlet; a piston mounted in each cylinder for reciprocation therein to uncover said inlet to admit liquid and to cover said inlet and eject liquid through said valve-controlled outlet; a plurality of tubular injection needles respectively connected to said cylinders in fluid-communication with said outlets, said needles extending downward from said lower wall of said housing; upstanding stems connected with said pistons and projecting upward from the respective cylinders into said chamber; spring means within said chamber and respectively connected with said piston stems for returning said pistons to elevated position; actuator means disposed above said piston stems in normally spaced relation with respect thereto; and reciprocable actuating stem means connected with said actuator means and mounted in and extending upwardly through said upper wall of said housing for engagement to depress said actuator means and said piston stems, said stem means and said piston stems having means to return them to elevated position.

13. A combination as in claim 12 wherein said means to return said stem means and piston stems constitutes spring means carried by said piston stems and spring means mounted on said stem means externally of said upper wall.

14. A combination as in claim 13 including means adjustably secured upon said stem means externally of said upper wall to regulate the stroke of said stem means.

JOYCE A. GORDON.
ISRAEL A. GORIN.

References Cited in the file of this patent

UNITED STATES PATENTS

| Number | Name | Date |
| --- | --- | --- |
| 474,965 | McCormick | May 17, 1892 |
| 751,555 | Prescott | Feb. 9, 1904 |
| 1,192,596 | Albrecht | July 25, 1916 |
| 1,271,490 | Servatius | July 2, 1918 |
| 1,637,951 | Marchione | Aug. 2, 1927 |
| 1,641,976 | Lawrent | Sept. 13, 1927 |
| 2,156,023 | McKay | Apr. 25, 1939 |
| 2,183,370 | Selitzky | Dec. 17, 1939 |
| 2,361,126 | Klein | Oct. 24, 1944 |
| 2,552,195 | Lopata | May 8, 1951 |

FOREIGN PATENTS

| Number | Country | Date |
| --- | --- | --- |
| 123,230 | Great Britain | Feb. 20, 1919 |